(12) United States Patent
Hsu

(10) Patent No.: US 6,933,836 B2
(45) Date of Patent: Aug. 23, 2005

(54) BIKE BRAKING WARNING CONTROL

(76) Inventor: Richard Hsu, PO Box 82-144, Taipei (TW)

( * ) Notice: Subject to any disclaimer, the term of this patent is extended or adjusted under 35 U.S.C. 154(b) by 99 days.

(21) Appl. No.: 10/701,508

(22) Filed: Nov. 6, 2003

(65) Prior Publication Data

US 2005/0099277 A1     May 12, 2005

(51) Int. Cl.$^7$ ................................................ B62J 3/00
(52) U.S. Cl. ........................ 340/432; 340/464; 340/479
(58) Field of Search ........................... 340/432, 463, 340/464, 467, 468, 479; 180/205, 206, 65.1, 180/220; 362/464, 473

(56) References Cited

U.S. PATENT DOCUMENTS

| | | | |
|---|---|---|---|
| 3,878,387 A | * | 4/1975 | Kovacic ................. 362/473 |
| 5,617,303 A | * | 4/1997 | Izzo, Sr. ................. 362/473 |
| 6,446,745 B1 | * | 9/2002 | Lee et al. ................. 180/206 |
| 6,690,266 B1 | * | 2/2004 | Jack et al. ................. 340/432 |
| 6,874,592 B2 | * | 4/2005 | Yokotani et al. ............ 180/205 |

FOREIGN PATENT DOCUMENTS

GB     2229052 A   *   12/1990

\* cited by examiner

*Primary Examiner*—Van T. Trieu
(74) *Attorney, Agent, or Firm*—Leong C. Lei

(57) ABSTRACT

A bike warning light control device essentially having a LED warning light provided on the rear mudguard of the bike; only a few LED bulbs are lighted when the power source is activated; when the brake is applied, a magneto switch on the handlebar clears away from the magnetic field of a magnet provided to the braking level to turn on all LED bulbs to warn the approaching vehicles; or a wireless signal transmission and receiving modulus are respectively provided to light all those LED bulbs of the warning light separately provided on a helmet to improve warning results and facilitate assembly of the present invention.

4 Claims, 4 Drawing Sheets

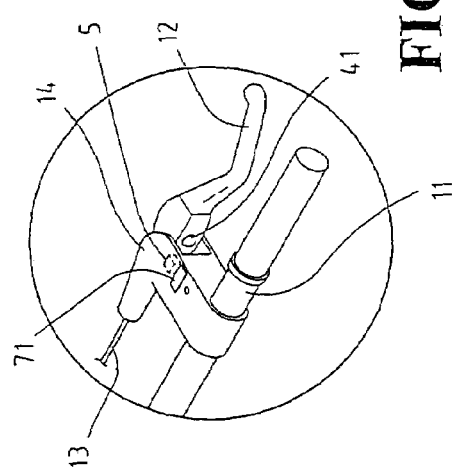
FIG. 3A
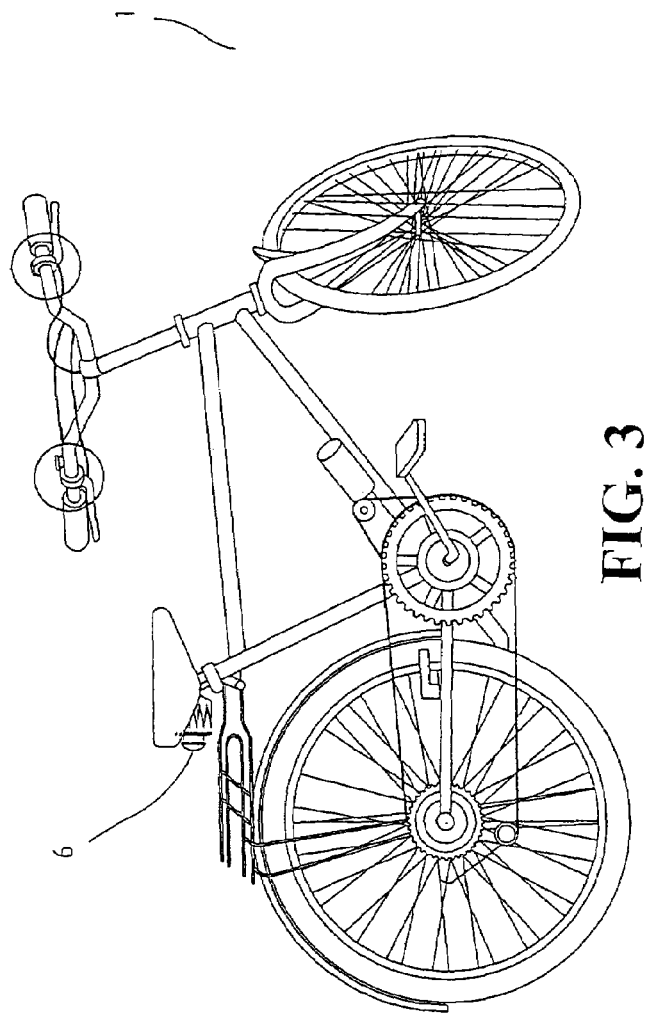
FIG. 3B
FIG. 3

BIKE BRAKING WARNING CONTROL

BACKGROUND OF THE INVENTION (a) Field of the Invention

The present invention is related to a braking warning control device adapted to a bike, and more particularly to one magneto-switch mounted on the handlebars in conjunction with a magnet provided at the head of the brake level to actuate the source and turn on the LED bulb in the warning light whenever the rider applies the brake.

(b) Description of the Prior Art

Bike had been the main transportation means for a long time until motorcars are developed in recent decades; however, the bike remains the most convenient transportation means either for riding for fun and exercise or for a shorter range commuting in downtown. As more and more cars moving on the streets, it becomes particularly dangerous for night bike riders. Therefore, as illustrated in FIG. 1 of the accompanying drawings, a reflective plate 2 is mounted on the rear mudguard of the bike 1. In recent years, a warning light has been developed to emit light or flare for warning when the brake is applied to start the power source to the light. The prior art of the brake warning light is adapted to the rear mudguard with the power control mounted at where between the braking cable and the braking drum 3 resulting in higher cost and prevented from easy assembly, and further prevented from easy DIY by the rider. The fact that the prior art has not yet been mounted to the bikes generally available in the market proves that the prior art fails to meet the requirements of the bike manufacturers.

SUMMARY OF THE INVENTION

The primary purpose of the present invention is to provide a bike braking warning control device for a warning light to be turned on to warn the approaching vehicle by turning on the bulb on the warning light whenever the rider applies the brake. To achieve the purpose, a magneto switch and battery are provided in the braking fixture, a magnet is provided on the braking level, and a warning light is provided on the rear mudguard of the bike.

Another purpose of the present invention is to provide a bike braking warning control device to facilitate mounting a braking warning light to the existing bike. To achieve the purpose, a box containing a magneto switch and battery is locked to the handlebars of the bike by means of a fastener sleeve to such extent that the magneto switch is falling within the magnetic field of the magnet attached to the braking level so to conduct the bulb of the warning light whenever the rider applies the brake.

Another purpose yet of the present invention is to provide a bike braking warning control device to improve warning result by having multiple LED bulbs adapted to the warning light and only a few LED bulbs will be lighted when conducted and all the LED bulbs will be turned on when the brake is applied.

Another purpose yet of the present invention is to provide a bike braking warning control device to facilitate the DIY of a warning light by the rider. To achieve the purpose, a wireless signal transmitter is connected to the power source of the magneto switch and a wireless signal receiver is mounted on the warning light so to turn on the warning light without wiring.

Another purpose yet of the present invention is to provide a bike braking warning control device for adapting a warning light to the helmet of the rider and is activated by receiving wireless signals when the brake is applied.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIGS. 3, 3A, 3B are schematic views showing an assembly of a control structure of the present invention.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 4:
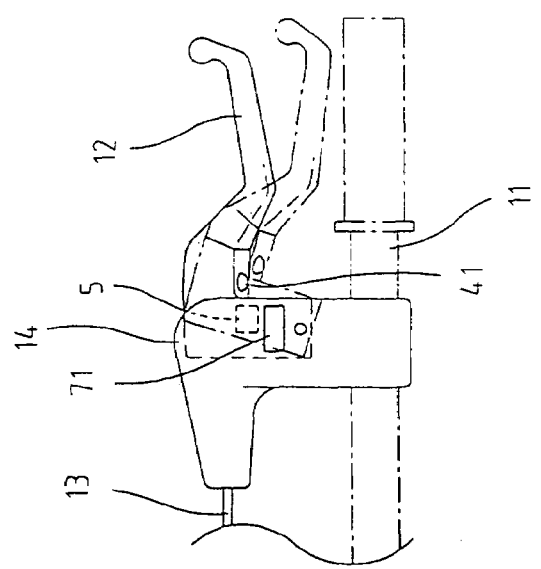
FIG. 4 is a schematic view showing the operation of the present invention.
Figures 6, 6A:
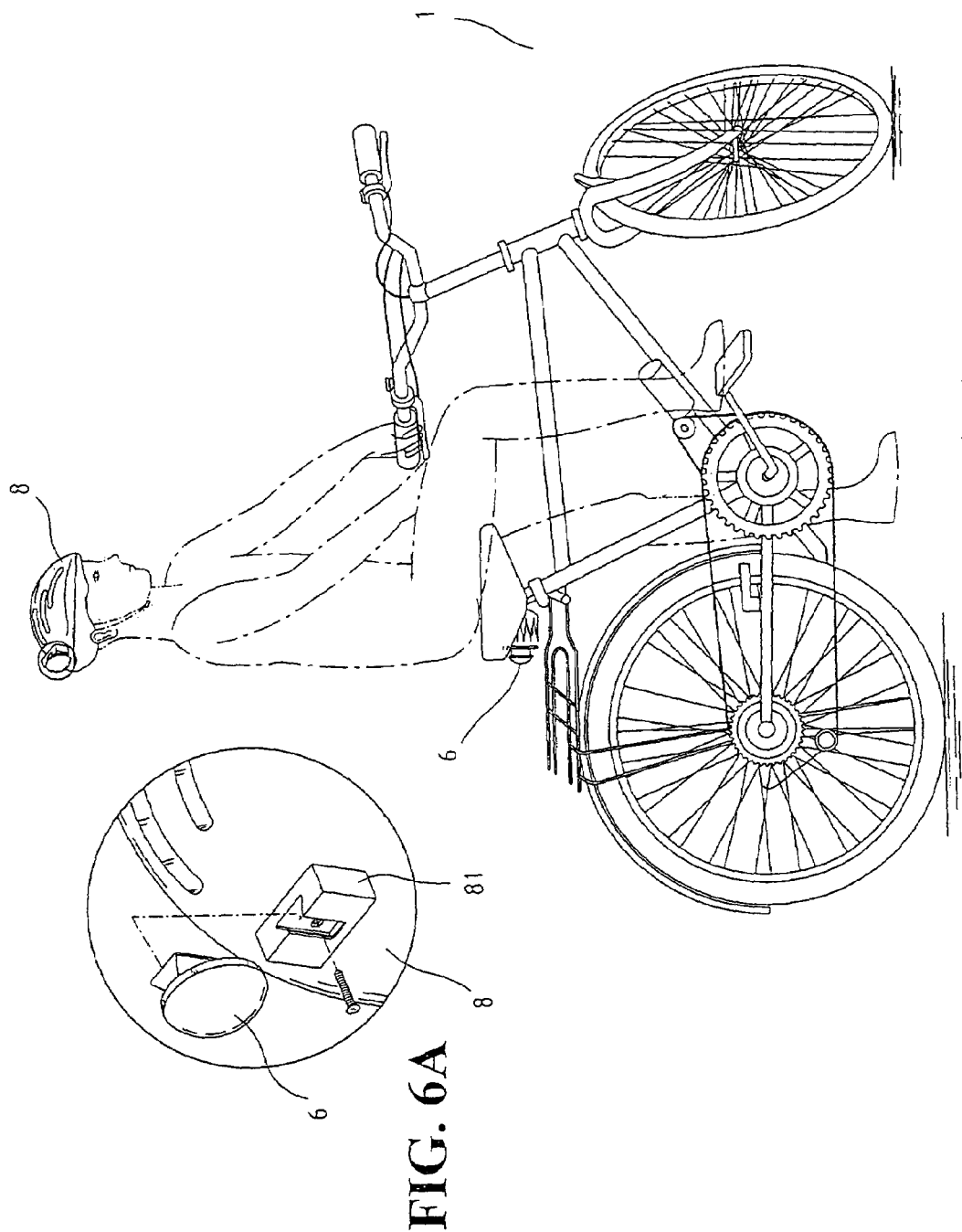
FIGS. 6, 6A are schematic views showing that the present invention is applied to a rider's helmet.

Referring to FIGS. 2, 3, 3A and 3B, if the present invention is applied to a new unit of bike, a space is reserved in a braking fixture 14 on a handlebar 11 to accommodate a magneto switch 5 and a battery 7. A battery lid 71 covers up the battery to facilitate the replacement of battery. A space to accommodate a magnet 4 is provided to a braking level 12 connected to a braking cable 13 with the space to be covered up with a lid 41 or the magnet 4 is provided within the lid 41 so to insert the lid 41 into an insertion hole 121 provided on the braking level 12. As illustrated in FIG. 6, multiple bulbs and a power source are provided to a warning light 6 to be attached to the rear mudguard of the bike and a conductor is connected from the warning light 6 to the power source of the magneto switch 5 and the batter 7 on the braking fixture 14 to complete the installation. The power source may be provided on the braking fixture 14 or elsewhere, thus is not illustrated herein. When the power is activated, some of those bulbs in the warning light are turned on to maintain warning. Once the rider of the bike applies the brake, the braking level 12 is pressed down as illustrated in FIG. 4 to displace the magnet 4 for the magneto switch 5 to on the braking fixture 14 to clear away from the magnetic field of the magnet 4 on the braking level 12 to conduct the source to the warning light 6, and all those bulbs are conducted to be lighted with higher intensity of light to warn the approaching vehicle. Furthermore, IC control may be used to flare the lighted bulbs to achieve warning purpose.

Figure 2:
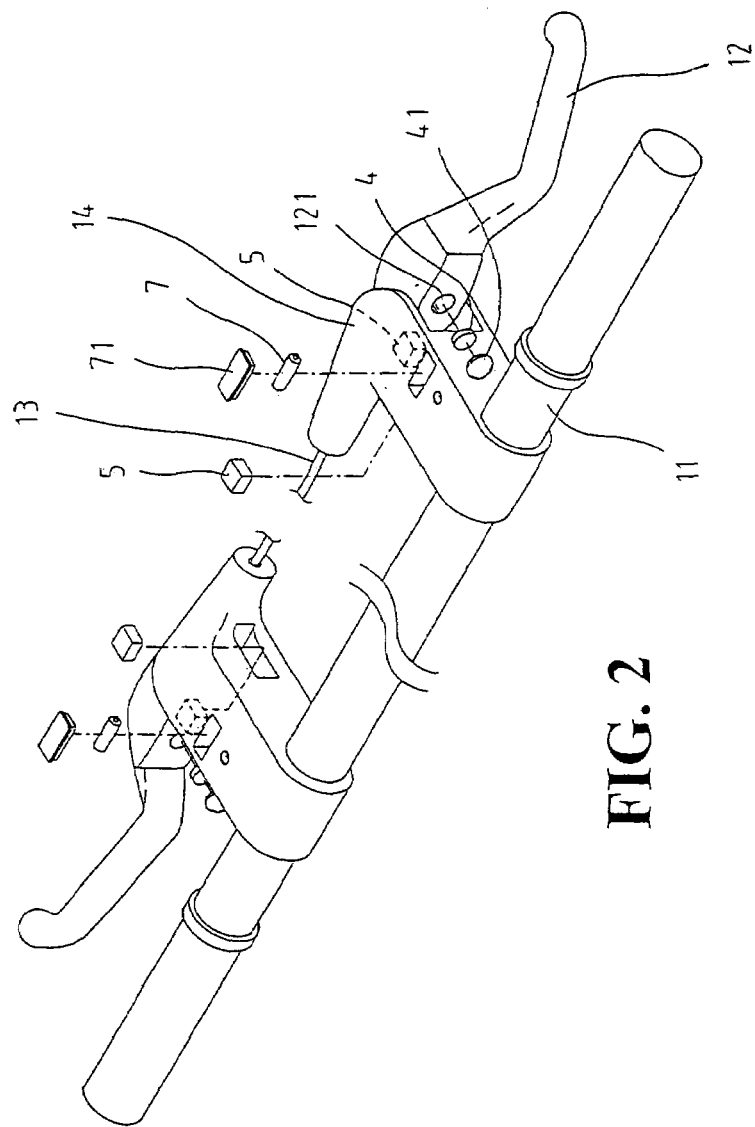
FIG. 2 is a preferred embodiment of the present invention.
Figure 1:
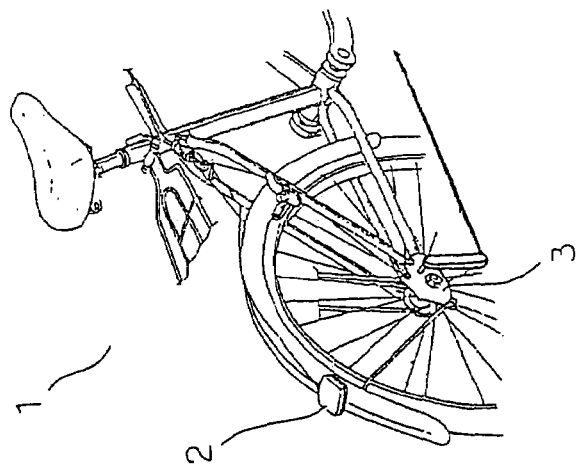
FIG. 1 is a schematic view showing a bike warning light of the prior art.
Figure 5:
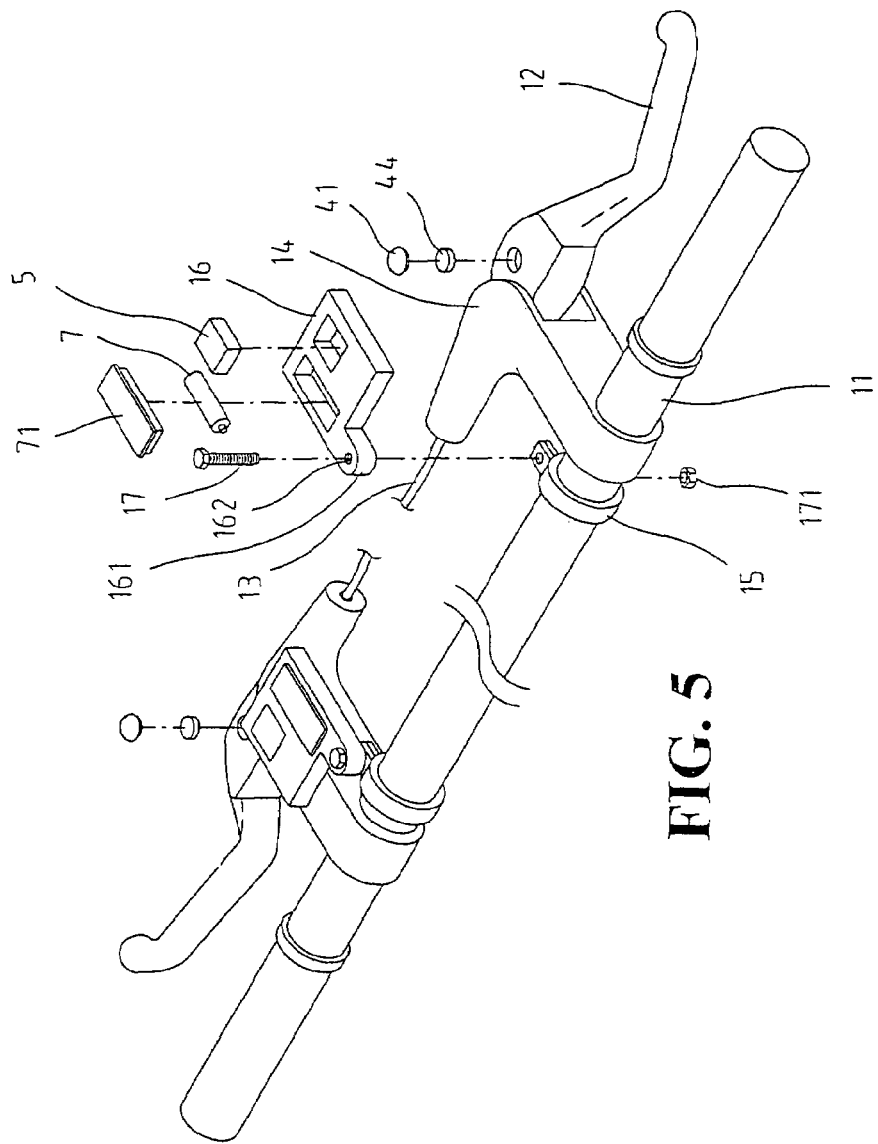
FIG. 5 is a schematic view of another preferred embodiment of the present invention.

If the present invention is applied to an existing bike, a fastener sleeve 15 is mounted to the handlebar 11 at where close to the side of the existing braking fixture 14 as illustrated in FIG. 5. A control box 16 containing the magneto switch 5 and the battery 4 is locked to the fastener sleeve 15. A protrusion tab 161 with a through hole 162 is provided to the control box so to easily mount the control box 16 to the handlebar with a screw 17 and a nut 171 with the magneto switch 5 fixed on one side in the control box 16 to be close to the braking level 12, and the magnet 4 attached to a flat surface on the braking-level 12 for the magneto switch 5 to fall-within-the-range of the magnetic field of the magnet 4 before the braking level 12 is pressed to apply the brake. With some of those bulbs are lighted, the warning light device maintains its warning effect.

Furthermore, to facilitate the assembly of the present invention by the rider, a wireless signal transmission module is added to the output end of the magneto switch 5, and in the braking fixture 14 or in the control box 16 while a wireless signal receiving module is mounted in the warning light 6 thus to save the connection of wires. If the rider tries DIY, he just has to lock the control box 16 to the handlebar and to stick the magnet 4 to the braking level.

As illustrated in FIGS. 6, 6A another warning light 6 of the present invention is mounted to the insertion frame 81 of a helmet 8. The warning light 6 may be made in other geometric forms for a better appearance. When the rider applies the brake, both of the warning lights 6 provided on the helmet and the rear mudguard will be turned on or flaring to improve the warning results.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A bike warning light control device, wherein, a magneto switch and a battery being provided in a braking fixture of the bike, a magnet being inserted to a braking lever, the magneto switch being located within the magnetic field of the magnet, and a warning light with its on and off controlled by the magneto switch being provided on a rear mudguard of the bike.

2. A bike warning light control device as claimed in claim 1, wherein, the magneto switch and the battery are contained in a box, a fastener sleeve being locked to a handlebar, and the magneto switch inside the box falling within the magnetic field of the magnet.

3. A bike warning light control device as claimed in claim 1, wherein, multiple LED bulbs and battery source are provided in the warning light, the warning light being fixed to the rear mudguard of the bike; those LED bulbs being partially lighted when the source is conducted; and all LED bulbs being lighted when the source to the magneto switch is conducted.

4. A bike warning light control device as claimed in claim 1, wherein, the magneto switch is integrated with a wireless signal transmission module, and a wireless signal-receiving module is provided in the warning light to save the connection of electric wires.

* * * * *